US008843565B2

(12) United States Patent
Essenmacher et al.

(10) Patent No.: US 8,843,565 B2
(45) Date of Patent: Sep. 23, 2014

(54) CATEGORIZING ELECTRONIC MESSAGING COMMUNICATIONS

(75) Inventors: Michael D. Essenmacher, Red Hook, NY (US); Thomas E. Murphy, Jr., Hopewell Junction, NY (US); Frank V. Paxhia, Salt Point, NY (US); William A. Ruby, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 12/134,241

(22) Filed: Jun. 6, 2008

(65) Prior Publication Data

US 2009/0307613 A1    Dec. 10, 2009

(51) Int. Cl.
*G06F 15/16* (2006.01)
*G06Q 10/10* (2012.01)

(52) U.S. Cl.
CPC ................................. *G06Q 10/107* (2013.01)
USPC ........................... 709/206; 709/205; 709/207

(58) Field of Classification Search
USPC ................................................ 709/204–207
See application file for complete search history.

(56) References Cited

U.S. PATENT DOCUMENTS

| | | | |
|---|---|---|---|
| 6,557,027 B1 * | 4/2003 | Cragun | 709/204 |
| 2002/0178231 A1 * | 11/2002 | Matsa et al. | 709/206 |
| 2003/0208545 A1 * | 11/2003 | Eaton et al. | 709/206 |
| 2004/0078435 A1 * | 4/2004 | Dunbar et al. | 709/206 |
| 2005/0262199 A1 * | 11/2005 | Chen et al. | 709/204 |
| 2007/0067404 A1 * | 3/2007 | Brown et al. | 709/206 |

\* cited by examiner

*Primary Examiner* — Harunur Rashid
(74) *Attorney, Agent, or Firm* — William A. Kinnaman, Esq.; Kevin P. Radigan, Esq.; Heslin Rothenberg Farley & Mesiti P.C.

(57) ABSTRACT

Electronic messaging communications, including Instant Messaging messages, are organized into particular categories, as selected by the users providing the messages. This enables messages of a particular category to be displayed at a recipient of the messages, while other messages are masked from view. It also facilitates the capturing of certain related messages to the exclusion of others.

21 Claims, 4 Drawing Sheets

CATEGORIZING ELECTRONIC MESSAGING COMMUNICATIONS

TECHNICAL FIELD

This invention relates, in general, to electronic messaging, and in particular, to categorizing electronic messaging communications.

BACKGROUND OF THE INVENTION

As the workforce continues to collaborate among many diverse locations, certain electronic communications mediums and utilities have become an integral part of the communications tools of the workforce. One such tool is Instant Messaging (IM).

The current taxonomy of IM conversations is by user. For example, Mary initiates a conversation with Joe, and both ends of this IM conversation have the same context. The entire Mary-Joe conversation, regardless of subject or subjects, is shown on both Mary and Joe's IM windows.

Unfortunately, the sequential nature of the existing Instant Messaging art tends to simply append the most recent dialogue into the scrolling window, whatever the most recent topic of discussion might have been. For instance, someone may be carrying on a series of ongoing conversations with a peer which includes a sequence of several independent unrelated subjects (e.g. Subject A (business), Subject B (personal), Subject C (business confidential)). The contents of the Subject A (business) discussion, which was followed by a discussion of Subject B (personal), will appear in the dialogue window, when the IM dialogue window is reopened.

Over a period of time, discussion is continued between the two peers and all subjects are merged within the same IM dialogue window, inherently, with the last topic discussed appearing within the viewable dialogue re-display window. In this example, the dialogue content of Subject B (personal) is shown, whether or not that is desired.

This classic problem proves to be awkward when, for instance, an individual is asked to IM someone in a public setting. Inevitably, the remnants of prior dialogues will appear in plain view, regardless of being of a personal or private nature.

Another classic problem surfaces when it is desirable to capture specific topics from within the ongoing Instant Message dialogue transcript. Complications arise when many topics are threaded serially within one comprehensive Instant Message transcript. Typically, topic specific discussions are often woven through the entire dialogue and need to be tediously located, extracted, and reconstituted into a separate composite transcript, using standard utilities. This problem becomes especially more pronounced as IM clients commonly record and catalog transcripts of IM sessions, which may represent hours or days of dialogue, with no topic awareness.

SUMMARY OF THE INVENTION

Based on the foregoing, a need exists for a capability that masks selected dialogues of electronic messaging communications from others within view, depending on, for instance, subject. A further need exists for a capability to maintain separate discussions related to particular categories (e.g., subjects).

The shortcomings of the prior art are overcome and additional advantages are provided through the provision of a computer-implemented method of categorizing electronic messaging communications. The method includes, for instance, selecting a category of which an electronic messaging communication is to be included; and automatically including the electronic messaging communication in the selected category, wherein separate threads of electronic messaging communications are provided based on selected categories.

Systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided to categorize electronic messaging communications by, for instance, subject. As used herein, electronic messaging communications includes communications (e.g., messages) of messaging protocols, such as Instant Messaging and text messaging, as examples. It does not include e-mail; however, messaging protocols other than those mentioned above may also incorporate one or more aspects of the present invention.

The categorization of the communications enables the communications to be separated by a selected category. As one example, the selected category includes subject; however, other categories may be provided.

Figure 1:
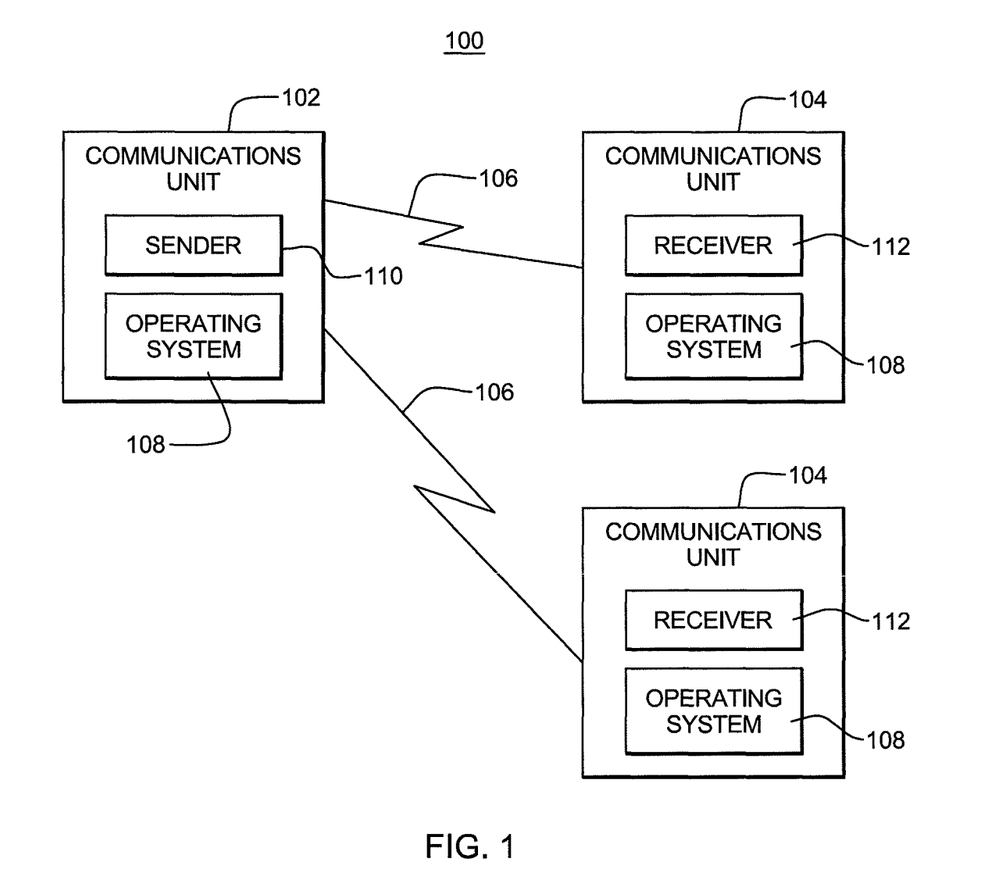
FIG. 1 depicts one example of a communications environment to incorporate and use one or more aspects of the present invention.

One embodiment of a communications environment to incorporate and use one or more aspects of the present invention is described with reference to FIG. 1. A communications environment 100 may include, for instance, a communications unit 102 coupled to a plurality of other communications units 104 via one or more connections 106. A communications unit may include, for instance, a personal computer, a laptop, a handheld unit, a workstation, a mainframe, a mini computer, a node or any other type of unit capable of sending and/or receiving electronic messaging communications. Communications unit 102 may or may not be the same type of communications unit as communications units 104. Additionally, each of communications units 104 may or may not be the same type of unit as another communications unit 104. The connections coupling the units are, for instance, any type of network connection, such as an internet connection, a local area network (LAN); a wide area network (WAN); a token ring; an Ethernet connection, etc.

Each communications unit 102, 104 executes, for example, an operating system 108, such as, for instance, AIX®, offered by International Business Machines Corporation, Armonk, N.Y.; Linux; Windows®; or other operating systems, etc. (AIX® and IBM® are registered trademarks of International Business Machines Corporation, Armonk, N.Y., U.S.A. Windows® is a registered trademark of Microsoft Corporation, Redmond, Wash. Other names used herein may be registered trademarks, trademarks or product names of International Business Machines Corporation or other companies.) The operating system of one communications unit may be the same or different from another communications unit. Further, in other examples, one or more of the communications units may not include an operating system. Although three (3) communications units are depicted in FIG. 1, more or less units may be included. In one example, communications unit 102 is communicatively coupled to a number of communications units.

Communications unit 102 includes, for instance, a sender 110, which sends communications to one or more communications units 104. In this example, each of communications units 104 includes a receiver 112 that receives and may respond to the communications received from sender 110. As one particular example, the communications sent between the communications units are via the Instant Messaging protocol. Instant Messaging dialogues are maintained on the Instant Messaging server, on each Instant Messaging client, or on some other server, as examples.

In accordance with an aspect of the present invention, each Instant Message dialogue has associated therewith a subject tag that indicates the subject to which the dialogue belongs, and a timestamp. An Instant Messaging dialogue (or conversation, chat, discussion, etc.) may be initiated with a new subject or included under an existing subject from a previously started dialogue. Discussions with the same subject made at different times are differentiated via the timestamp tag. Further details regarding initiating dialogues under a particular subject are described with reference to FIGS. 2 and 3. As one example, this logic is performed by the communications unit (e.g., IM peer) that is starting a messaging dialogue.

Figure 2:
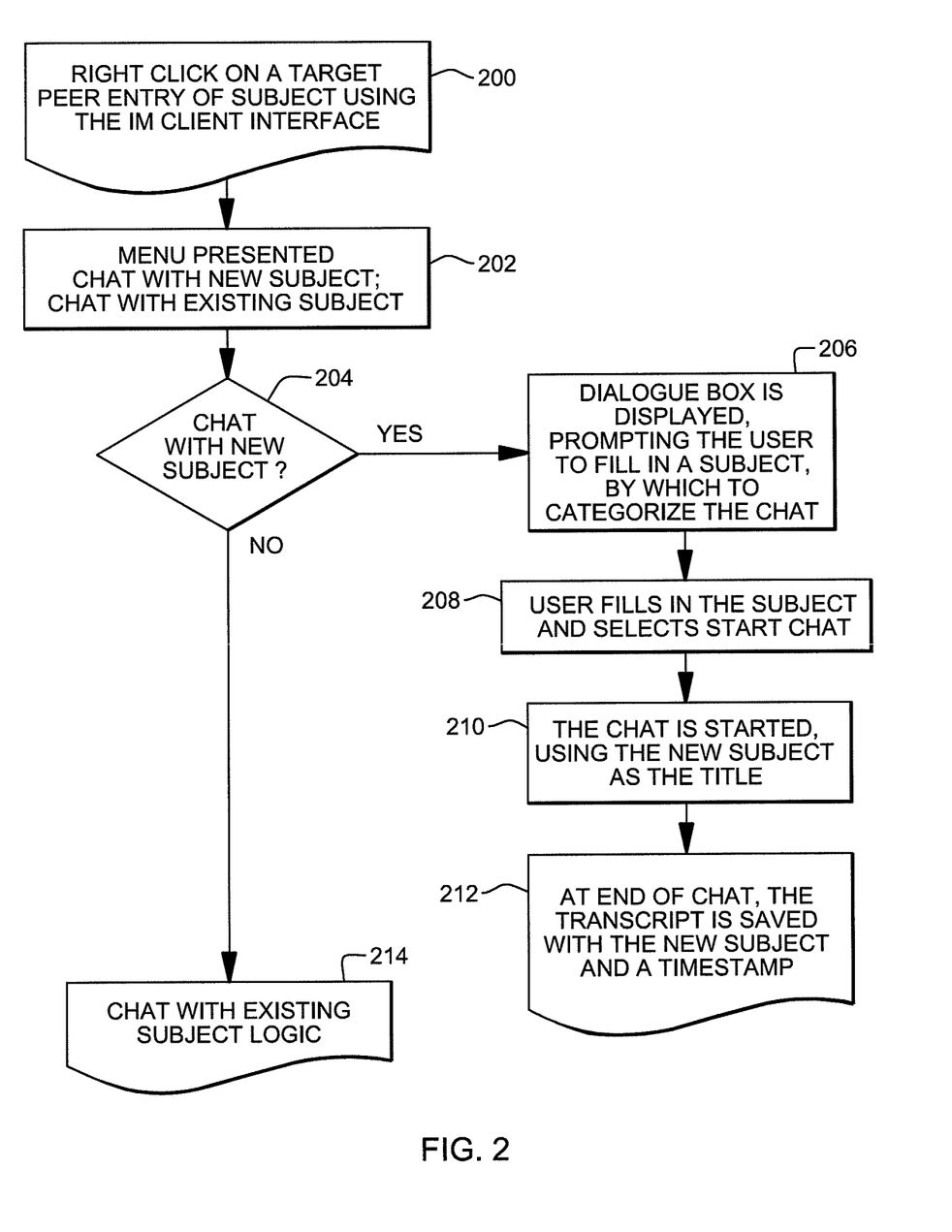
FIG. 2 depicts one embodiment of the logic associated with messaging under a new subject, in accordance with an aspect of the present invention.

Referring initially to FIG. 2, a user initiates a chat with a target Instant Messenger peer by, for instance, right clicking on a target peer or subject entry using an Instant Messaging client interface, STEP 200. A menu is presented that provides the options of chatting under a new subject or chatting under an existing subject, STEP 202. The user selects either of the two options. If chat with new subject is selected, a dialogue box is displayed that allows the user to fill in the subject, STEP 206. The subject is used to categorize the chat. The user fills in the subject and selects start chat to start the discussion, STEP 208. This results in a new dialogue window being opened.

A further result is that an alert is provided to the recipient. In particular, as subject-specific discussions arrive from the initiator, the associated subject thread dialogue box is alerted. The alert, titled with the topic of the discussion and the user name of the peer originator, notifies the user of the arrival of the discussion. In one example, the alert includes raising a window to the foreground or by other appropriate means, as alert policies are defined.

Moreover, a hierarchical view of chats is provided, and thus, in response to providing the subject, an addition is made to the hierarchical view. For instance, the new subject is placed below the entry from which the new chat was initiated. One example of a hierarchical view is shown below:

In this example, the hierarchical view is subject threading by user. As shown, the user is listed, as well as the user's status (offline, online), one or more subjects for which the user has had dialogues (indicated by θ+ in this example), and titles of the dialogues listed thereunder (indicated by ■ in this example).

Another hierarchical view that is available is threading by subject, as shown below:

In this example, the users are not indicated; just the subjects and the titles of the dialogues indented thereunder. Other views are also possible.

Continuing with reference to FIG. 2, the chat is started using the new subject as the title, STEP 210. At the completion of the chat, the transcript is saved, in one embodiment. This includes associating the transcript with the new subject and assigning a timestamp thereto, STEP 212. This provides a topic-specific record that is automatically created and includes the saved transcripts of that topic.

Figure 3:
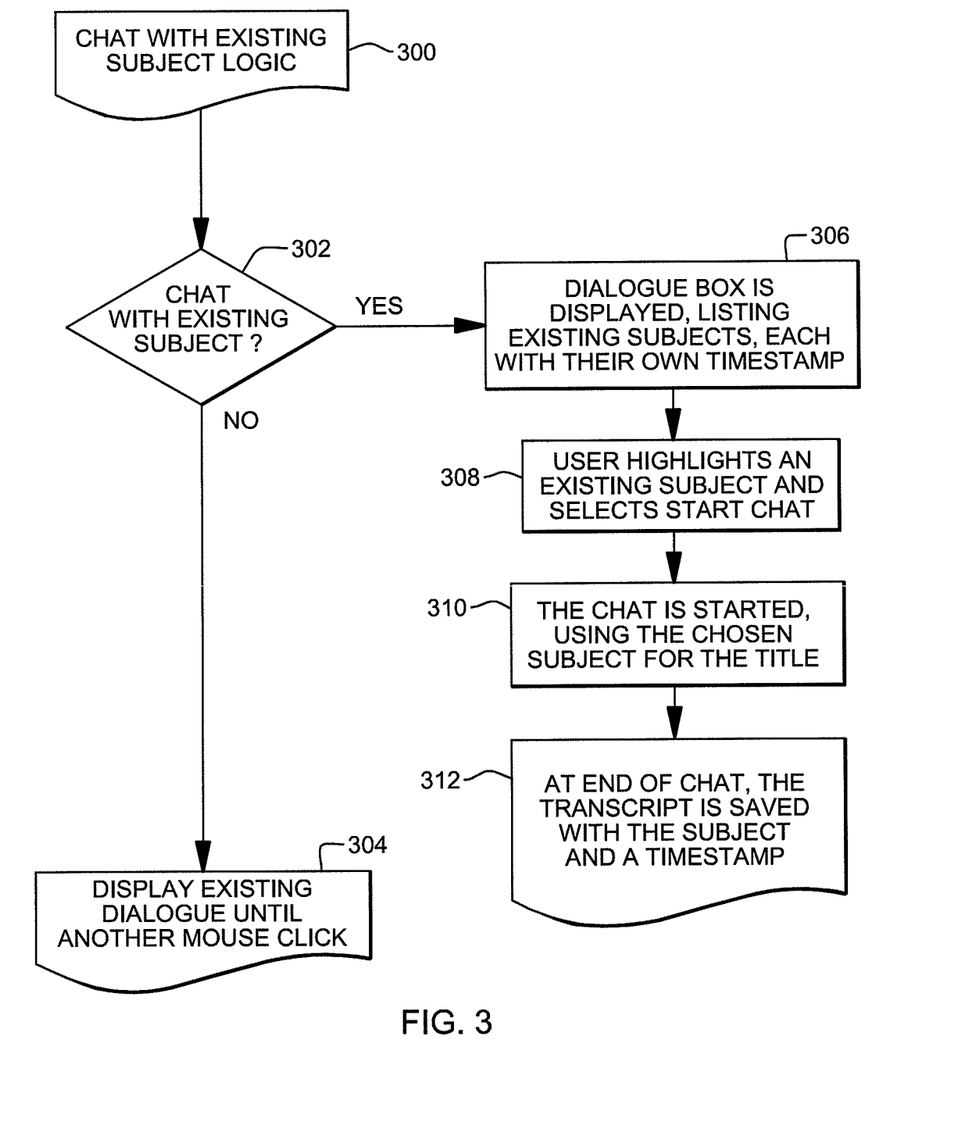
FIG. 3 depicts one embodiment of the logic associated with messaging under an existing subject, in accordance with an aspect of the present invention.

Returning to INQUIRY 204, if the chat is not with a new subject, but with an existing subject, then processing continues with the chat with existing subject logic, STEP 214, an example of which is depicted in FIG. 3.

Referring to FIG. 3, in response to selecting chat with existing subject, STEP 300, confirmation of this selection is requested, INQUIRY 302. If the confirmation fails, then the existing dialogue is displayed until an option or other selection is made, STEP 304.

However, if the dialogue is with an existing subject, INQUIRY 302, then a dialogue box is displayed that includes the current subjects. If the same subject has multiple dialogues, then the dialogues are displayed and assorted by timestamp format, in one example, STEP 306. For instance, the user's subject—topics can be displayed in a sub-tree of a panel, using cascaded or tiled sub-windows, or in many other ways.

The user selects an existing subject in which to conduct the discussion and starts a chat, STEP 308. In one example, this selection is performed by the user highlighting the existing subject and then selecting start chat. The chat is started using the chosen subject for the title, STEP 310. When the discussion is complete, the transcript data is saved with the subject and the timestamp, STEP 312. This completes processing associated with chatting under an existing subject.

In a further embodiment, when initiating a discussion with the target Instant Messenger peer, one can either initially or subsequently seed a separate dialogue box by copy-cut/paste into a spawned subject specific discussion. This scenario can be repeated for any number of subject discussion topics. This enables a transcript from a separate discussion, whether on the same or different topic, to be pasted into a new or existing discussion, at any time.

The user has the mechanism to organize the subject topics according to subject hierarchies and by user, as described above.

In order to accommodate a discussion that goes off topic, a technique to spawn a new subject discussion, from the existing chat window, is available to contain the new topic contents. Initiating a fresh dialogue to an existing established Instant Messaging peer inherently provides a fresh slate and has no artifacts of other unrelated or sensitive discussion items intermixed into the dialogue box. Copying or saving transcripts for forwarding are virtually ready to go without the often tedious editing effort required of existing art embodiments.

Described in detail above is a capability in which conversations of messaging protocols, such as Instant Messaging, text messaging or other messaging protocols, are automatically categorized. In one example, they are categorized by subject. This allows dialogues, by all or both parties, to be maintained in separate succinct discussions related to a particular subject. This allows for the conversations to be maintained by category, and thus, located in an efficient and prompt fashion.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 4:
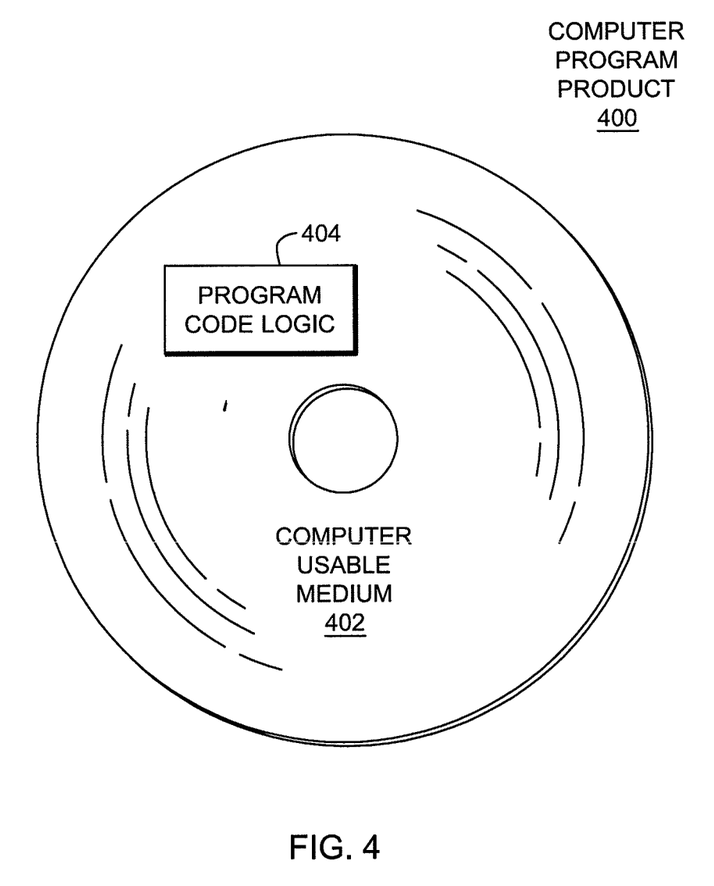
FIG. 4 depicts one embodiment of a computer program product incorporating one or more aspects of the present invention.

One example of an article of manufacture or a computer program product incorporating one or more aspects of the present invention is described with reference to FIG. 4. A computer program product 400 includes, for instance, one or more non-transitory computer usable media 402 to store computer readable program code means or logic 404 thereon to provide and facilitate one or more aspects of the present invention. The medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a dialogue with a person for a specific subject can be re-initiated and the transcript can be maintained within the realm of the specific subject. In a shared/viewable environment, either an initiated or unsolicited chat is afforded tremendous control over what is viewed by others in the last sequential chat re-display.

More granular, topic focused chat alerts are afforded. Topic-focus dialogue boxes are provided, as well as separately threaded transcripts. One or more aspects of the invention provide the following:

- An Instant Messaging user interface model which affords independent conversations that are indexed by subject (or other category).
- When initiating a discussion, a sub-tree selection from a panel or by cascaded or tiled sub-windows that may be anchored by user and sub-nested by subjects are allowed.
- With a target Instant Messaging peer, conversations are allowed to be started with "a new subject" or "an existing subject".
- Allows the subject topics to be organized by user and subject hierarchies.
- Control over what is viewed by others in the chat re-display. It is provided in a shared/viewable environment by allowing the chat to be re-initiated using preferred topic selection.
- Topic specific (ongoing) chat conversations provide efficient and focused dialogues.
- With topic specific dialogues, natural and focused transcripts are automatically yielded. This avoids the tedious and error prone editing effort, needed to produce the same transcript, using existing art. They can be re-initiated with a specific person for a specific subject and maintained within the same realm without the clutter and confusion of the existing art.

Although various embodiments are described above, these are only examples. For instance, other messaging protocols than those listed above may include one or more aspects of the present invention. Further, the dialogues can be categorized by other than subject. Yet further, other views can be supported. Moreover, the timestamp is optional. Many other changes, additions or deletions are also possible.

As a further example, the communications environment described above is only one example. There can be more or less communication units than described above. Also, the units can be different than that described above. As one particular example, the communications unit to send a communication may be a cell phone or other mobile device. Many other examples are also possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of categorizing electronic messaging conversations, said method comprising:
   establishing separate electronic messaging conversations between a first user and a second user, the separate electronic messaging communications employing different categories of a plurality of categories, the establishing comprising, for each separate electronic messaging conversation of the separate electronic messaging conversations:
      independently initiating the electronic messaging conversation by an initiating user of the first user and the second user independent of any existing electronic messaging conversation involving the initiating user; and
      responsive to the independently initiating the electronic messaging conversation:
         presenting to the initiating user one option to associate, for the first user and the second user, the electronic messaging conversation with an existing category to be selected from a list of one or more existing categories of the different categories, the one or more existing categories each having associated therewith one or more previously initiated separate electronic messaging conversations between the first user and the second user in which the list of the one or more existing categories is presented to the initiating user for selection therefrom, and in which one or more electronic messaging conversations associated with the selected category are displayed in a conversation window of the initiating user and are grouped together in sequence in that conversations associated with other categories are not included in the group of the one or more electronic messaging conversations;
         presenting to the initiating user another option to associate, for the first user and the second user, the electronic messaging conversation with a new category to be provided by the initiating user, wherein the new category is other than the one or more existing categories;
         choosing by the initiating user the one option or the another option in selecting a category with which the independently initiated electronic messaging conversation is to be associated for the first user and the second user; and
         automatically associating, for the first user and the second user, said independently initiated electronic messaging conversation with the selected category.

2. The computer-implemented method of claim 1, wherein the list of the one or more existing categories from which to select is presented to the initiating user based on the initiating user choosing the one option to associate the electronic messaging conversation with an existing category of the one or more existing categories.

3. The computer-implemented method of claim 2, wherein an existing category of the one or more existing categories has associated therewith at least two electronic messaging conversations each having associated therewith a respective timestamp, and wherein the presenting the list of the one or more existing categories comprises presenting the existing category and the at least two electronic messaging conversations associated therewith, along with each respective timestamp of the at least two electronic messaging conversations.

4. The computer-implemented method of claim 1, wherein the independently initiated electronic messaging conversation comprises an instant message of the Instant Messaging protocol.

5. The computer-implemented method of claim 1, wherein the independently initiated electronic messaging conversation comprises a message of a messaging protocol, said messaging protocol excluding e-mail communications.

6. The computer-implemented method of claim 1, further comprising composing a composite transcript of conversations of the selected category, said composite transcript including at least the electronic messaging conversation, wherein the composite transcript exclusively includes electronic messaging conversations of the selected category.

7. The computer-implemented method of claim 1, wherein the method further comprises:
   in response to the initiating user choosing the another option to associate the electronic messaging conversation with a new category, providing a category and associating the electronic messaging conversation with the provided category.

8. The computer-implemented method of claim 1, wherein the automatically associating the independently initiated electronic messaging conversation with the selected category comprises storing the electronic messaging conversation with a timestamp.

9. The computer-implemented method of claim 1, wherein the method further comprises: in response to the initiating user selecting the one option to associate the electronic messaging conversation with an existing category of the one or more existing categories, presenting to the initiating user the list of the one or more existing categories, selecting the existing category from the list of the one or more existing categories, and associating the electronic messaging conversation with the existing category selected from the list of the one or more existing categories.

10. A computer system for categorizing electronic messaging conversations, said computer system comprising:
 a memory; and
 a processor in communications with the memory, wherein the computer system is configured to perform:
  establishing separate electronic messaging conversations between a first user and a second user, the separate electronic messaging communications employing different categories of a plurality of categories, the establishing comprising, for each separate electronic messaging conversation of the separate electronic messaging conversations:
   independently initiating the electronic messaging conversation by an initiating user of the first user and the second user independent of any existing electronic messaging conversation involving the initiating user; and
   responsive to the independently initiating the electronic messaging conversation:
    presenting to the initiating user one option to associate, for the first user and the second user, the electronic messaging conversation with an existing category to be selected from a list of one or more existing categories of the different categories, the one or more existing categories each having associated therewith one or more previously initiated separate electronic messaging conversations between the first user and the second user in which the list of the one or more existing categories is presented to the initiating user for selection therefrom, and in which one or more electronic messaging conversations associated with the selected category are displayed in a conversation window of the initiating user and are grouped together in sequence in that conversations associated with other categories are not included in the group of the one or more electronic messaging conversations;
    presenting to the initiating user another option to associate, for the first user and the second user, the electronic messaging conversation with a new category to be provided by the initiating user, wherein the new category is other than the one or more existing categories;
    choosing by the initiating user the one option or the another option in selecting a category with which the independently initiated electronic messaging conversation is to be associated for the first user and the second user; and
    automatically associating, for the first user and the second user, said independently initiated electronic messaging conversation with the selected category.

11. The computer system of claim 10, wherein the list of the one or more existing categories from which to select is presented to the initiating user based on the initiating user choosing the one option to associate the electronic messaging conversation with an existing category of the one or more existing categories.

12. The computer system of claim 10, wherein the computer system is further configured to perform: composing a composite transcript of conversations of the selected category, said composite transcript including at least the electronic messaging conversation, wherein the composite transcript exclusively includes electronic messaging conversations of the selected category.

13. The computer system of claim 10, wherein the computer system is further configured to perform:
 in response to the initiating user choosing the another option to associate the electronic messaging conversation with a new category, providing a category and associating the electronic messaging conversation with the provided category.

14. The computer system of claim 10, wherein the automatically associating the independently initiated electronic messaging conversation with the selected category comprises storing the electronic messaging conversation with a timestamp.

15. The computer system of claim 10, wherein the computer system is further configured to perform: in response to the initiating user selecting the one option to associate the electronic messaging conversation with an existing category of the one or more existing categories, presenting to the initiating user the list of the one or more existing categories, selecting the existing category from the list of the one or more existing categories, and associating the electronic messaging conversation with the existing category selected from the list of the one or more existing categories.

16. An article of manufacture comprising:
 at least one non-transitory computer usable medium having computer readable program code logic to facilitate categorizing electronic messaging conversations, said computer readable program code logic when executing performing the following:
  establishing separate electronic messaging conversations between a first user and a second user, the separate electronic messaging communications employing different categories of a plurality of categories, the establishing comprising, for each separate electronic messaging conversation of the separate electronic messaging conversations:
   independently initiating the electronic messaging conversation by an initiating user of the first user and the second user independent of any existing electronic messaging conversation involving the initiating user; and
   responsive to the independently initiating the electronic messaging conversation:
    presenting to the initiating user one option to associate, for the first user and the second user, the electronic messaging conversation with an existing category to be selected from a list of one or more existing categories of the different categories, the one or more existing categories each having associated therewith one or more previously initiated separate electronic messaging conversations between the first user and the second user in which the list of the one or more existing categories is presented to the initiating user for selection therefrom, and in which one or more electronic messaging conversations associated with the selected category are displayed in a conversation window of the initiating user and are grouped together in sequence in that conversations associated with other categories are not included in the group of the one or more electronic messaging conversations;

presenting to the initiating user another option to associate, for the first user and the second user, the electronic messaging conversation with a new category to be provided by the initiating user, wherein the new category is other than the one or more existing categories;

choosing by the initiating user the one option or the another option in selecting a category with which the independently initiated electronic messaging conversation is to be associated for the first user and the second user; and automatically associating, for the first user and the second user, said independently initiated electronic messaging conversation with the selected category.

17. The article of manufacture of claim 16, wherein the list of the one or more existing categories from which to select is presented to the initiating user based on the initiating user choosing the one option to associate the electronic messaging conversation with an existing category of the one or more existing categories.

18. The article of manufacture of claim 16, wherein the computer readable program code logic when executing further performs composing a composite transcript of conversations of the selected category, said composite transcript including at least the electronic messaging conversation, wherein the composite transcript exclusively includes electronic messaging conversations of the selected category.

19. The article of manufacture of claim 16, wherein the computer readable program code logic when executing further performs:
in response to the initiating user choosing the another option to associate the electronic messaging conversation with a new category, providing a category and associating the electronic messaging conversation with the provided category.

20. The article of manufacture of claim 16, wherein the automatically associating the independently initiated electronic messaging conversation with the selected category comprises storing the electronic messaging conversation with a timestamp.

21. The article of manufacture of claim 16, wherein the computer readable program code logic when executing further performs: in response to the initiating user selecting the one option to associate the electronic messaging conversation with an existing category of the one or more existing categories, presenting to the initiating user the list of the one or more existing categories, selecting the existing category from the list of the one or more existing categories, and associating the electronic messaging conversation with the existing category selected from the list of the one or more existing categories.

* * * * *